United States Patent [19]

Buehler et al.

[11] Patent Number: 5,516,815
[45] Date of Patent: May 14, 1996

[54] STARCH-CONTAINING FIBERS, PROCESS FOR THEIR PRODUCTION AND PRODUCTS MADE THEREFROM

[75] Inventors: Friedrich Buehler, Thusis; Viktor Baron, Domat/Ems; Eduard Schmid, Bonaduz; Peter Meier, Waedenswil; Hans-Joachim Schultze, Chur, all of Switzerland

[73] Assignee: EMS-Inventa AG, Switzerland

[21] Appl. No.: 390,165

[22] Filed: Feb. 17, 1995

Related U.S. Application Data

[62] Division of Ser. No. 973,055, Nov. 6, 1992, abandoned.

[30] Foreign Application Priority Data

Nov. 7, 1991 [DE] Germany ............... 41 36 694.8

[51] Int. Cl.$^6$ ............... C08L 3/00; C08L 67/02; C08L 77/02
[52] U.S. Cl. ............... 523/128; 523/124; 524/47; 525/54.24
[58] Field of Search ............... 524/47, 50, 52, 524/54, 48; 428/364, 395; 523/124, 128; 525/54.24, 54.31

[56] References Cited

U.S. PATENT DOCUMENTS

| | | | |
|---|---|---|---|
| 2,570,449 | 10/1951 | Horsák | 264/186 |
| 3,117,014 | 1/1964 | Klug | 106/213 |
| 4,366,275 | 12/1982 | Jilano et al. | 524/47 |
| 4,603,070 | 7/1986 | Steel et al. | 428/88 |
| 5,026,746 | 6/1991 | Floyd et al. | 524/50 |
| 5,095,054 | 3/1992 | Lay et al. | 524/47 |
| 5,256,711 | 10/1993 | Tokiwa et al. | 525/47 |
| 5,446,078 | 8/1995 | Vaidya et al. | 524/17 |

FOREIGN PATENT DOCUMENTS

| | | |
|---|---|---|
| 327505 | 8/1989 | European Pat. Off. . |
| 1470846 | 2/1969 | Germany . |
| 1470965 | 11/1969 | Germany . |
| 2001533 | 7/1971 | Germany . |
| 2042798 | 5/1972 | Germany . |
| 4104681 | 8/1991 | Germany . |
| 635274 | 4/1950 | United Kingdom . |
| 14938 | 12/1990 | WIPO . |
| 2559 | 2/1992 | WIPO . |

OTHER PUBLICATIONS

Database WPI, Week 8035, Class A, AN 80–61299C JPA–55–93,812; Jul. 17, 1980.
Database WP1, Section CH, Week 8035 JPA–55–93,812, Jul. 17, 1980.

*Primary Examiner*—Paul R. Michl
*Assistant Examiner*—Mark L. Warzel
*Attorney, Agent, or Firm*—Bierman and Muserlian

[57] ABSTRACT

A starch fiber produced by a spinning process and comprising:

A A first amount of 1 to 100 parts of a starch melt-spinnable composition comprising
 1. a second amount of 56 to 96 parts of at least one modified and/or unmodified starch,
 2. a third amount of 4 to 40 parts of at least one destructuring agent,
 3. a fourth amount of 0 to 4 parts of at least one additive, selected from urea, urea derivatives, emulsifiers, lubricants, and proteins and their alkali salts,
components 1, 2 and 3 totaling 100 parts; and B a fifth amount of 99 to 0 parts of at least one melt-spinnable polymer,
ingredients A and B totaling 100 parts.

In addition, there may also be included 0 to 20 parts of conventional additives for melt spinning compositions.

The invention further relates to a process for the production of these starch fibers from this melt spinning composition, and to uses for fibers which, by modification with the starch melt-spinnable composition, have special properties.

21 Claims, 1 Drawing Sheet

STARCH-CONTAINING FIBERS, PROCESS FOR THEIR PRODUCTION AND PRODUCTS MADE THEREFROM

PRIOR APPLICATION

This application is a division of U.S. patent application Ser. No. 973,055 filed Nov. 6, 1992, now abandoned.

This application claims the priority of German Application 41 36 694.8, filed Nov. 7, 1991.

The present invention is directed to starch fibers produced from certain melt spinning compositions, their use as ingredients of other fibers, methods of producing them, and products made therefrom.

BACKGROUND OF THE INVENTION

There have been numerous attempts to make use of starch (a plant carbohydrate) as a "natural plastic" in a number of areas. It is important to commercial development that the starches be processible on standard equipment and use existing technology. However, natural starches are relatively grainy and, if they are to be suitably processed, they must first be destructured.

It has long been recognized that amylose, an important component of starch, is soluble in formaldehyde-containing aqueous solutions and alkaline aqueous solutions. In either case, the ultimate solutions obtained are relatively viscous and their stability is based primarily on the concentration of alkali or formaldehyde. Both solutions are suitable for the production of fibers, filaments, or foils.

The production of fibers, filaments, or foils from amylose has been carried out from solution in precipitation baths; i.e. wet spinning. This is set forth in, for example, DE-PS 10 63 325. However, there is no mention in this patent of any thermoplastic method.

In DE-OS 23 62 991, pharmaceutical preparations with delayed release of active ingredients for direct introduction into body cavities, are described. A mixture of the active ingredient and the polymer, including starch among other materials, is processed by melt spinning and extruded; the extrusion is then cut into pellets. These pellets are put into the usual melt spinning apparatus to produce fine fibers. The fibers are cut to a suitable length and carded dry to form "cotton" wads. The melt spinning process is mentioned very generally, but neither the process nor apparatus are not specifically described; only the use of hydroxypropyl cellulose and the extrusion are set forth. This melt spinning process is today the simplest and most widely used method for the production of synthetic filaments.

BRIEF DESCRIPTION OF THE INVENTION

It is, therefore, an object of the invention to provide novel starch or starch-modified fibers with special properties which can be produced from a biodegradable melt spinning composition, said composition to be spun by the current melt spinning processes and equipment. It is also an object of the invention to permit the use of the fibers thus produced, endowed with special properties, in a variety of applications.

It has now been found that the starch melt-spinnable compositions can be processed with polyamides, polyesters, and other polymers by thermoplastic methods to form fibers. For special applications, depending on the degree to which the starch or starch derivative is hydrophilic, portions soluble in cold water, soluble in hot water, or insoluble in water can be built into the synthetic fiber. For example, when such fibers, containing small amounts of starch melt-spinnable compositions insoluble in hot water, are treated with hot water, porous fibers are obtained. If the fiber contains more than 50% starch molding composition, the treatment with hot water produces a fine powder precipitate of the fiber polymer, which sinks if its density is greater than that of water. The starch-laden waste water is completely biodegradable, and the polymer precipitate can be filtered and regenerated.

Surprisingly, it has been found that, in homogeneous starch melt-spinnable compositions with polyesters, polyethers, or linear aliphatic polyamides, the thermoplastic, finely-dispersed, polymer component itself is also amenable to biodegradation. The more homogeneous the polymer component is with the starch molding composition, the faster the biodegradation takes place. Further, the rate of degradation depends on the length of the carbon chain between hydrolyzable groups. If this starch molding composition is used without the polymer component, an unusually quick biodegradation in less than 20 days is observed.

The invention also relates to starch fibers which can be spun by known methods thermoplastically from a starch molding composition. This melt-spinnable composition is notable for its easy processibility and can produce fibers, which are useful for biodegradable fabrics, nonwovens, knits, etc., and can serve as modifiers of traditional fibers; in particular, for filters, household fabrics, sanitary nonwovens, and the like. Fabrics and nonwovens made of these materials are usable for bags, cloths, nets, and especially for packing agricultural products of all kinds. Additional areas of use are root packings of plants, trees, flowers, and the like.

Further, the invention relates to areas of use for fibers which are given special properties by modification with the starch melt-spinnable composition. By the addition of starch, the disadvantage of the synthetic textile fibers with respect to the low moisture absorption can be eliminated and wearing comfort comparable to cotton fabrics achieved. Moreover, the high density of the starch melt-spinnable compositions provides higher weights and offers particular advantages where heavy fibers are required.

Especially advantageous is the use of fast biodegradable fibers as cigarette filters. Further, biodegradable fibers are also desirable for sanitary nonwovens, fabrics, operating room textiles, diapers, absorbent "cotton" and wound dressing materials.

In conjunction with starch, the properties of resorbable materials such as polyhydrobutyric acid, polyhydrovaleric acid, polylactides, polyglycolides, as well as their copolymers and blends, can be modified and processed to provide resorbable filaments and fabrics.

In the case of bi- or multi-component fibers containing starch melt-spinnable compositions, due to the hydrophilic nature of selectable starches, the starch melt-spinnable compositions, which are stable to cold water in the cooling bath, can be dissolved out in hot water, thereby obtaining porous fibers. This method can be used also for the production of hollow fibers, through the formation of a coextruded starch core. The fibers of the present invention can, of course, be produced in all shapes; e.g. round, star-shaped, and angular. The cores may be incorporated continuously or intermittently, and can subsequently be dissolved out wholly or partially.

The starch melt-spinnable composition can be used as matrix material in production of superfine fibers. After spinning the superfine fibers in the matrix, the matrix can be dissolved away with hot water in an ecologically friendly and economical manner and can either be reused or disposed of by biodegradation. These fibers can be used, for example, for the production of imitation suede or extremely fine-pored filter nonwoven materials.

The inventive melt-spinnable composition is also capable of giving synthetic fibers an antistatic finish. In addition, if the starch melt-spinnable composition contains residual water, it is suitable for flameproof finishing and reduces drip problems in synthetic fibers in a manner similar to metal hydroxide finishes in plastics.

Starch-modified fibers can serve for the production of separating yarns destroyable with hot water. They are useful as temporary or permanent adhesive fibers, depending on their water solubility, allowing temporary bondings, e.g. in nonwovens, to be separated again by steam treatment. Thus recyclable composite nonwovens of different materials can be produced.

For the production of permanent bondings, these fibers can be finished with reactive systems such as isocyanates; hindered isocyanates; formaldehydes; epoxies; hindered epoxies; anhydrides; and ester-, amide-, and carbamate-forming materials; and crosslinked immediately or subsequently.

Starch-modified fibers can be used in composite fiber technology as hot-water soluble fabric layers in order to keep different fiber materials separated. Later, after separation by hot water treatment, recycling of the pure material is possible.

Nowadays, synthetic fibers are used for paper reinforcement and for wet fiber finishing. However, they have the disadvantage that, when the paper is disposed of, these fibers are non-biodegradable. With the aid of starch-modified fibers, reinforced papers can be produced which are fully biodegradable. Papers with high starch fiber content are especially suitable as release papers, and insulating materials, as well as papers having improved sliding properties and printability, which are particularly suitable for use in photocopiers. On recycling, starch-modified paper reinforcement fibers break down into the water-soluble starch component, which remains in the pulp, and a pulverized polymer component which sinks, not being water-soluble and having a density higher than water, and which can thus be separated from the pulp for reutilization.

DETAILED DESCRIPTION OF THE INVENTION

Figure 1:
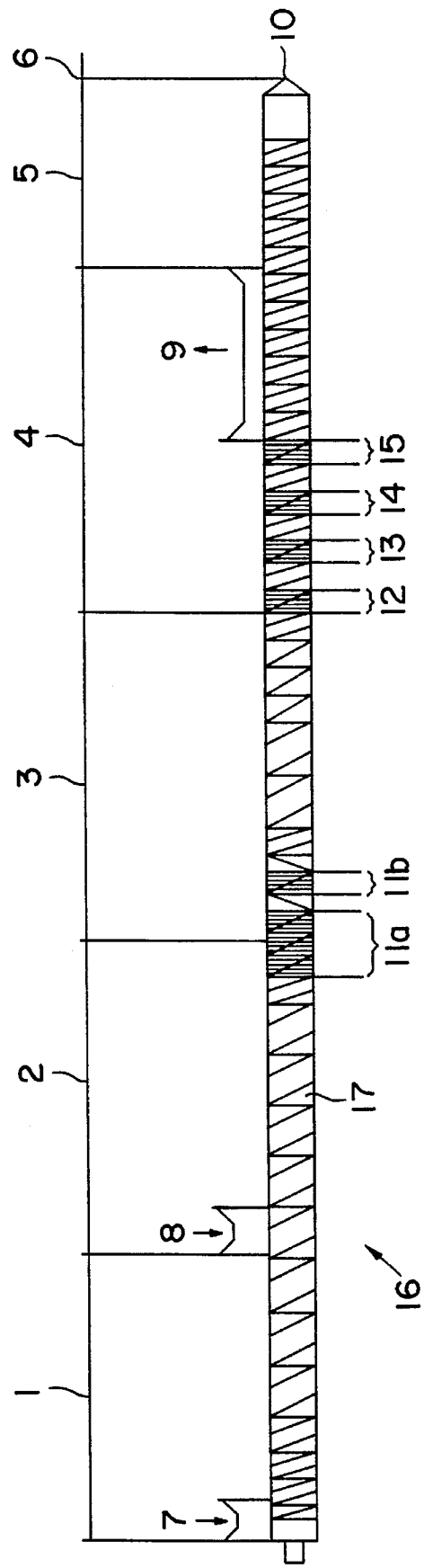
FIG. 1 is a schematic view of a twin-screw extruder useful in the present invention.

The starch fibers according to the invention are made from a melt spinning composition comprising the following components. Throughout the specification and claims, all parts and percentages are by weight:

A. 1 to 100 parts of a starch melt-spinnable composition comprising
1. 56 to 96 parts of at least one modified and/or unmodified starch,
2. 4 to 10 parts of at least one destructuring agent,
3. 0 to 4 parts of at least one additive, selected from the group consisting of urea, urea derivatives, emulsifiers, lubricants, proteins and their alkali salts, and mixtures thereof,
the parts of components 1, 2, and 3 totaling 100; and B. 99 to 0 parts of at least one melt-spinnable polymer, the parts by weight of components (A) and (B) adding up to 100.

In addition to the foregoing there may also be present 0 to 20 parts of materials of the prior art customarily added to melt spinning compositions.

Preferably, the additive consists of at least one of 0.1 to 2 parts of urea and/or urea derivatives, and 0.1 to 2 parts of at least one emulsifier. Preferably, the melt spinning composition consists of 20 to 95 parts, especially 20 to 80 parts, and most particularly 50 to 60 parts, of component A and of 80 to 5, preferably 80 to 20, more particularly 50 to 20, parts of component B. Component A advantageously contains the destructuring agent in quantities of 9 to 40 parts, more desirably 10 to 30 parts.

In a preferred embodiment, the starch fiber according to the invention is produced by a melt spinning process and which consists of the following components:

A. 10 to 100, preferably 30 to 100, parts of a starch melt-spinnable composition comprising
1. 66 to 90 parts of at least one modified and/or unmodified starch,
2. 10 to 30 parts of at least one destructuring agent,
3. 0 to 4 parts of at least one additive selected from the group consisting of urea, urea derivatives, emulsifiers, and lubricants,
the parts of components 1, 2, and 3 adding up to 100; and B. 90 to 0 parts, preferably 70 to 0 parts, of at least one melt-spinnable polymer,
the parts of components A and B adding up to 100.

In addition, there may also be present 0 to 10 parts of materials of the prior art customarily added to melt spinning compositions.

A particularly preferred form of the melt spinning composition according to the invention contains component A in an amount of from 20 to 95, more particularly 20 to 80, parts and component B in an amount of from 80 to 5, more particularly 80 to 20, parts, 50 to 80 parts of component A and 50 to 20 parts of component B being most preferred.

The chemically modified or unmodified starch to be used according to the invention advantageously has a natural water content of 5% to 16%, preferably 5% to 12%, more particularly 6% to 8% by weight. The preferred starch melt-spinnable composition can be produced by the process described in U.S. patent application Ser. No. 890,563, filed May 28, 1991, now U.S. Pat. No. 5,316,578. The starch having a natural water content, in the presence of at least one plasticizer, urea or urea derivative, and at least one emulsifier, is broken down at suitable elevated temperatures and pressures in an extruder and extruded as a melt.

In the present process, this starch is then chemically modified by reaction of its OH groups with alkylene oxides or other ether-, ester-, urethane-, carbamate- and/or isocyanate-forming substances. Preferred are hydroxy-, $C_2$- to $C_6$ alkyl-, acetyl- or carbamate-starches or mixtures thereof.

The degree of substitution of the chemically modified starch is 0.01 to 3.0, preferably 0.05 to 1.0. The amylose content of the modified or unmodified starch used is 20% to 100%, preferably 50% to 100%, and most preferably 65% to 100%. For water-resistant starch fibers, hydrophobic starch derivatives of a degree of substitution of 2 to 3 are particularly useful.

The plasticizer is advantageously an organic compound having at least one hydroxyl group, preferably a polyol. Sorbitol, mannitol, D-glucose, ethylene glycol, polyethylene glycol, propylene glycol, and mixtures thereof have been found to be especially suitable.

The additive is present in quantities of from 0 to 4 parts. Preferred are urea, urea derivatives, emulsifiers, lubricants, proteins and their alkali salts, and mixtures thereof. The urea and/or urea derivatives are employed in amounts of 0.1 to 2 parts, more preferably 0.1 to 1 parts, and most preferably 1 part.

In a preferred embodiment, component A consists of 70 parts hydroxyethyl and/or hydroxypropyl starch with a degree of substitution of 0.06 and an amylose content of 50%, 15 parts glycerol, 13.8 parts sorbitol, 1 part urea, and 0.2 parts magnesium stearate. As component B, suitable thermoplastic polymers having a melting or softening point of 50° to 220° C. are recommended.

As component B, aliphatic polyamides and polyesters having a melting or softening point of 50° to 160° C. and a melt-flow index (MFI) of 50 to 8000 Pa.s (at 160° C. and 21.2N.) are particularly recommended. Most advantageous are homo- and/or copolyamides from omega-amino carboxylic acids and lactams, as well as homo- and/or copolyamides derived from diamines (including polyether diamines), dicarboxylic acids, and/or dimerized fatty acids. Amongst the diamines, aliphatic diamines are most advisable and, amongst the dicarboxylic acids, those which are linear are worthy of special mention.

As to the chain length, the omega-amino carboxylic acids advantageously have 2 to 12 carbon atoms, preferably 6 to 12 carbon atoms. The lactams have desirably 4 to 12 carbon atoms, most desirably 6 to 12 carbon atoms. The more useful diamines have 2 to 12 carbon atoms, preferably 2 to 6 carbon atoms. The dicarboxylic acids of particular note have 2 to 12 carbon atoms and are linear.

Examples of specific compounds are lactam-6, lactam-11, lactam-12, omega-amino caproic acid, omega-amino undecanoic acid, omega amino dodecanoic acid, dimethylene diamine, tetramethylene diamine, hexamethylene diamine, polyether diamine, oxalic acid, succinic acid, adipic acid, sebacic acid, dodecane diacid, azelaic acid, dimerized fatty acid from saturated fatty acids with 17 to 19 atoms, and mixtures thereof.

With respect to biodegradability, materials are preferred which are themselves biodegradable, such as polycaprolactone, polyhydroxybutyrates, polyhydroxyvalerates, polylactides, and mixtures thereof. Also useful are linear aliphatic polymers, such as polyamides, polyesters, polyethers, polyurethanes, which are biodegraded in homogeneous starch-polymer mixtures.

As additional materials, one or more of optic brighteners, stabilizers, antioxidants, flame retardants, dyes, pigments, fillers, processing adjuvants, plasticizers, crosslinking or branching agents, etc. can be used in amounts totaling from 0 to 20 parts.

The process of the invention for the production of starch fibers from a melt spinning composition as discussed above comprises (a) production of a spinning melt having a water content of 1 to 15% by weight based on said melt-spinnable composition by fusing said melt-spinnable composition and said melt-spinnable polymer in a ratio of 1:99 to 100:0 by weight to form said melt whereby components A and B have been granulated separately or jointly before (b) transporting said melt without substantial cooling to a spinnert packet whereby a melt filtration is alternately suspended (c) melt spinning said melt to form said fiber (d) cooling said fiber (e) applying a spinning preparation (f) drawing and winding the said fiber (g) aftertreatment of the cooled fiber In step (a), component A, component B, if present, and the optional prior art materials, are fused together in a compounding extruder in a ratio of component A to B of, for example, 1:99 to 100:0 parts. Without cooling, the starch melt-spinnable composition so produced is conveyed to the spinnerette packet. It can be further processed by melt spinning into fibers whereby, in a preferred manner, a granulate is first produced, which is then employed for the production of the spinning melt and fibers.

The water content of the spinning granulate is desirably adjusted to 1% to 15% by weight, preferably to 2% to 10% by weight, more particularly to 5% to 8% by weight, based on the starch melt-spinnable composition.

Production of the fibers according to the invention from the melt spinning compositions occurs by the usual melt spinning process. Monofilaments, multifilaments, staple fibers, nonwovens, hollow fibers, multi-component fibers, and superfine fibers embedded in a matrix, can all be produced by using the compositions and methods of the present invention. The process for the production of these fibers may be in one stage, with a compounding extruder producing the molding composition e.g. by the process described in German Patent Application P 41 17 628.6, and conveying it without cooling through a melt filter to the spinnerette packet. Alternatively, two stages, starting with a previously produced granulate which is melted in a conveyor extruder and conveyed to the spinnerette packet, may also be used.

The spinnerette packet consists of a known assembly, the funnel-shaped distributor insert being adapted to the fluidity of the melt, so that every nozzle opening has the same rate of flow. The spinnerette plate may have one to several thousand nozzle bores with hole diameters customary for fiber production.

After the spinnerette packet, the filaments pass through a cooling section, are provided with a spinning preparation, and are wound on spools or deposited in cans. As cooling media, liquids or gases are used. Suitable liquids for water-soluble fibers are nonpolar, incompatible with water, and with low solidification points. For water-resistant fibers, water is used. As dry cooling sections, quenching chambers in which the filaments are cooled with cold air, nitrogen, or carbon dioxide as cooling gas, are used. The wound or deposited filaments can now be guided over a drawing unit, drawn, and wound as smooth filaments or, if desired, crimped, fixed, and cut to form staple fibers. Alternatively, the filaments can be further drawn directly and wound as smooth filament.

Suitable drawing units are, for smooth multifilaments, draw-twisting, draw-winding machines, and spin-draw-winding units; for monofilaments, compact monofil spinning-drawing units; and for staple fibers, drawing lines and compact spinning-drawing lines. These drawing lines are equipped with heatable or partly unheated drawing units with rollers as well as idler rollers. They may also have steam, hot air, and infrared ducts, as well as brightening devices, crimping units, dryers, cutters, and other units.

Following the drawing process, all known finishing measures can be carried out. For example, a brightener, which preferably contains emulsifiers, may be applied. The emulsifiers become anchored to the polar head group at the surface, thereby locating the nonpolar end on the outside. The fixing or relaxing of the filaments or fibers is usually carried out on these installations after the stretching operation. To produce especially fine counts, threads of pure starch, and polymers with a high starch content, can be subjected to plastic elongation, these threads being treated in the elongation step preferably with steam and then dried with air. The rapidly spun multifilaments can be draw-textured on machines known for this purpose in the usual manner.

For the production of multi-component fibers or superfine fibers embedded in a matrix, the starch melt and the polymer melt are conveyed to the spinnerettes separately and combined without phase mixing. In a preferred process, the fibers are conducted into a heated bath, which preferably contains water, the water-soluble starch component being dissolved out of the fiber either completely or sectionwise.

In a special form of the invention, fibers with defined profiles or superfine fibers are obtained which are suitable, for example, for the production of imitation suede. In a further embodiment, the fiber is conducted into the solvent bath or heated waterbath, the soluble sheath or core being dissolved thereby. In this manner, hollow fibers with defined cavities (round, star-shaped, angular, etc.) and adjustable cut lengths can be obtained.

In particular, the present invention lends itself to the production of a) starch fibers without polymer additions b) synthetic fibers with starch addition c) porous synthetic fibers d) synthetic hollow fibers or starch hollow fibers e) synthetic superfine fibers or starch superfine fibers f) starch fibers containing polyhydroxybutyric acid, polyhydroxyvaleric acid, polycaprolactone, polylactides, and/or polyglycolides g) starch derivative fibers without polymer additions h) starch derivative fibers with polymer additions Some of the advantages of the above fibers are a) Fast biodegradability b) elevated density, antistatic properties, water solubility, and wet strength c) thermal insulation action of hollow fibers d) absorbance in porous and hollow fibers e) low density in porous fibers f) release properties h) moisture transmission With the invention it has thus been possible, for the first time, to find a favorable and ecologically friendly composition by which the moisture content of synthetic fibers can be controlled, and which is compatible with traditional fiber materials. For subsequent uses, this hydrophilic additive can be removed after the production of the fiber, ideally through simple, ecologically friendly processes. The wash solution obtained is completely biodegradable, causing no pollution of any kind. On washing out the hot-water-soluble adjuvant, porous fibers or fibers with defined cavities are formed. In another application, the plastic material decomposes in powder form after dissolution of the hydrophilic component. Due to their starch content, fibers according to the invention are antistatic and flame-retardant. In special applications, such as in carpets, their higher densities are of advantage.

Preferred applications for starch fibers without polymer additions, i.e. without component B, and for synthetic fibers with starch addition, are in the sector of paper conversion and paper reinforcement. Where complete biodegradability of all components is demanded, or polymer additions are to be separated by a process described above and reused after pulverization, the inventive materials are useful. Especially preferred is the production of biodegradable filters, in particular cigarette filters or sanitary nonwovens, and the production of biodegradable textile fabrics for one-time use.

Preferred also is the production of air, oil, and vacuum cleaner filters. Starch-modified, washable synthetic fibers are most useful as textile fabrics for improved moisture absorption, to increase the wearing comfort of clothing.

Starch or starch-modified synthetic fibers destroyable with steam or hot water are suitable for the production of composite nonwovens, composite fabrics, or knit goods consisting of different materials which, after the destruction of the binding fibers, are to be reused without further processing. These low-pollution fibers are useful in particular for the manufacture of fiber composite materials where removable construction aids are needed, or where removable separating fabrics, as between individual fiber plies, is advantageous. Especially preferred are bonding fibers which increase the strength of temporary bonds and can be removed after they have carried out their intended function. A special advantage of these hot-water-destroyable fibers is that nearly all synthetic fibers are insoluble in water so that their form is preserved after the destruction of the binding fibers; the starch component can be dissolved and is biodegradable, and the plastic component of the binding fiber decomposes to powder and can be reused.

Porous fibers or hollow fibers can be used as especially light-weight insulating materials. Because of their rough surfaces, the porous fibers are especially suitable for needling to nonwovens and fabrics. Furthermore, these fibers, having considerably increased surface area, are usable for the manufacture of absorbent nonwovens, in particular for diapers, "cotton" oakum, or for other filter materials of high absorption.

Starch fibers which are modified with polymers resorbable by the human body, such as polyhydroxybutyric acid (PHB), polyhydroxylvaleric acid (PHV), polylactides, and polyglycolides, can be used as surgical sutures. Superfine synthetic fibers, made with the aid of a starch matrix, are suitable for the manufacture of superfine fabrics which can be employed as imitation suede or as filter materials. The fibers according to the invention may have round, hollow, and multilobal fiber cross-sections.

For the aftertreatment of the fibers the following possibilities exist:

a) Physical aftertreatment, such as crimping; and b) chemical aftertreatment; i.e. all chemical aftertreatment and conversion methods such as those used in paper conversion as well as in cellulose treatment.

For the production of foam fibers, an alternative treatment option may consist in the addition of foaming agents to the melt spinning composition. Substances which develop gases under the treatment conditions may also be used for this purpose.

In the accompanying drawing, constituting a part hereof and in which like reference characters indicate like parts, FIG. 1 is a schematic view of a twin-screw extruder useful in the present invention.

Extruder 16 is equipped with corotational twin screws 17 which extend through independently heat controlled zones 1 to 6. Feed opening 7, which may be equipped with two proportioning devices (not shown) for solids permits charging the material to be processed.

Second feed opening 8 comprises a proportioning device for liquids. The solids and the liquids are introduced in the appropriate ratios through feed openings 7 and 8, respectively. Shafts 17 rotate and transfer the material being processed through zones 1 to 6, extruding the material through nozzle 10.

It is important to provide two-stage kneading chamber 11a and 11b; additional optional kneading chambers 12 to 15 may also be present. The latter would be used for the incorporation of further materials as is known in the art.

The following examples are to illustrate the invention, but are not limiting.

I. Production of the starch molding composition (component A)

EXAMPLE 1

The starch melt-spinnable composition, which was subsequently granulated, comprises 70 parts hydroxypropyl corn starch having a degree of substitution of 0.06 and an amylose content of 50% 15 parts glycerol, 12.8 parts sorbitol, 2 parts urea, and 0.2 parts magnesium stearate.

The extruder is set as follows:

| a) Heating zones: | 1 room temperature |
| --- | --- |
| | 2 130° C. |
| | 3 130° C. |
| | 4 100° C. |
| | 5 100° C. |
| | 6 150° C. |
| b) Pressure Zone 6: | $3 \times 10^6 - 4 \times 10^6$ Pa (30–40 bar) |
| c) Torque: | 70% |
| d) Vacuum: | $-4 \times 10^4$ Pa (−0.4 bar) |

The corotational, closely meshing twin screw extruder with a screw as shown in FIG. 1 has a screw length to diameter ratio of 41. 70 parts of hydroxypropyl corn starch (having a degree of substitution of 0.06 and an amylose content of 50%) and 12.8% of sorbitol are separately introduced at feed opening 7 in zone 1 of extruder 16. Rotating shafts 17 convey the mixture to zone 2, where a prehomogenized mixture of 0.2 parts of magnesium stearate and 2.0 parts of urea (both dissolved in 15 parts of glycerol) at 60° C. are introduced at feed opening 8. The ingredients are conveyed through kneading chamber 11a and 11b between zones 2 and 3 where mixing and destructurization of the starch takes place, resulting in the formation of a homogeneous melt.

Thereafter, in zone 4, a vacuum is applied at point 9 to degasify the melt. The melt is then carried through heating zone 5 to zone 6 where it is extruded through nozzle 10. Nozzle 10 is an expansion nozzle wherein the diameter of the opening is 3.0 mm and the extrusion diameter is 4.0 mm. The extrusion is cooled and, if desired, granulated.

The yellowish granulate has a water content of 5% to 8% as compared to a water content of the starch of 9% to 12%. The homogeneous, thermoplastically processible starch melt thus produced has a melt viscosity of 3000 Pa.s at 160° C. and 236.4N.

II. Preparation of the starch-plastic melt-spinnable compositions for fiber production

EXAMPLES 2 to 32

The starch granulate of Example 1 is mixed with the granulate of synthetic fiber material (component B) and introduced into zone 1 of twin-screw extruder 16 (ZSK-30 from Werner & Pfleiderer) with 6 heating zones. The speed is 100 rpm and the throughput 8 to 10 kg/h.

The type, melt temperature, melt viscosity, and weight percentage of the synthetic fiber material; and the starch melt-spinnable composition type, extrusion temperatures, and color quality are all compiled in Table 1. The material properties of the resulting starch mixtures are given in Table 2.

The melt viscosities of the synthetic fiber materials (component B) are determined according to DIN 53 735 at 160° C. and 21.2N. The melt viscosities of the starch mixtures are measured by a modified melt-flow index method at 160° C. and 236.4N. The water content is determined according to Karl Fischer per DIN 53 714, the melting point is measured by differential calorimetry in the dry state at a hearing rate of 20° C./min in a Du Pont Thermal Analyzer apparatus, Type 1091B.

In the Examples, the products used are as follows.

Grilon CF 62 BSE is a copolyamide based on the monomers PA-6 and PA-6.9 from EMS-CHEMIE having a melting point of about 136° C.

Grilon CR 9 is a copolyamide based on the monomers PA-6 and PA-12 from EMS-CHEMIE having a melting point of about 200° C.

Grilon CA 6E is a copolyamide based on the monomers PA-6 and PA-12 from EMS-CHEMIE having a melting point of about 130° C.

Grilamid ELY 60 is a copolyamide from EMS-CHEMIE based on lactam-12, polyetherdiamine, and dimerized fatty acid having a melting point of about 160° C.

Griltex 1 is a copolyamide from EMS-CHEMIE based on the monomers PA-6, PA-12, and PA-6.6 having a melting point of about 110° C and a melt viscosity (DIN 53 735) of about 600 Pa.s (21.2N./160° C.).

Griltex 2 is a copolyamide from EMS-CHEMIE based on the monomers PA-6, PA-12, and PA-6.6 having a melting point of about 125° C. and melt viscosity (DIN 53 735) of about 400 Pa.s (21.2N./160° C.).

Griltex 3 is a copolyamide from EMS-CHEMIE based on the monomers PA-6, PA-12, and PA-6.6 having a melting point of about 110° C. and a melt viscosity (DIN 53 735) of about 500 Pa.s (21.2N./160° C.).

Griltex 4 is a copolyamide from EMS-CHEMIE based on the monomers PA-6, PA-12 and PA-6.6 having a melting point of about 110° C. and a melt viscosity (DIN 53 735) of about 100 Pa.s (21.2N./160° C.).

Griltex 5 is a copolyamide from EMS-CHEMIE based on the monomers PA-6, PA-12, PA-6.6, and PA-11 having a melting point of about 80° C. and a melt viscosity (DIN 53 735) of about 150 Pa.s (21.2N./160° C.).

CAPA 650 is a polycaprolactone from the firm Interrox.

TABLE 1

| Examples | Component (B) Type | Melting point[1] (°C.) | Melt Viscosity[2] 21.2 N 160° C./Pa s | Percentage (parts by weight) | Starch Content Example 1 | T1 (°C.) | T2 (°C.) | T3 (°C.) | T4 (°C.) | T5 (°C.) | Tsch[3] (°C.) |
| --- | --- | --- | --- | --- | --- | --- | --- | --- | --- | --- | --- |
| 2 | Grilon CF 62 BSE | 136 | 3100 | 50 | 50 | 0 | 140 | 145 | 145 | 145 | 167 |
| 3 | Grilon CF 62 BSE | 136 | 3100 | 40 | 60 | 0 | 140 | 145 | 145 | 145 | 163 |
| 4 | Grilon CF 62 BSE | 136 | 3100 | 30 | 70 | 0 | 140 | 145 | 145 | 145 | 161 |
| 5 | Grilon CF 62 BSE | 136 | 3100 | 20 | 80 | 0 | 140 | 145 | 145 | 145 | 157 |

TABLE 1-continued

| | | Component (B) | | | | | | | | | |
|---|---|---|---|---|---|---|---|---|---|---|---|
| Examples | Type | Melting point[1] (°C.) | Melt Viscosity[2] 21.2 N 160° C./Pa s | Percentage (parts by weight) | Starch Content Example 1 | T1 (°C.) | T2 (°C.) | T3 (°C.) | T4 (°C.) | T5 (°C.) | Tsch[3] (°C.) |
| 6 | Grilon CF 62 BSE | 136 | 3100 | 10 | 90 | 0 | 140 | 145 | 145 | 145 | 165 |
| 7 | Grilon CR 9 | 200 | — | 50 | 50 | 0 | 210 | 230 | 230 | 230 | 235 |
| 8 | Grilon CA 6 A | 130 | 3600 | 50 | 50 | 0 | 140 | 140 | 140 | 140 | 165 |
| 9 | Grilamid ELY 60 | 160 | — | 50 | 50 | 0 | 150 | 170 | 150 | 150 | 179 |
| 10 | Grilamid ELY 60 | 160 | — | 30 | 70 | 0 | 150 | 170 | 150 | 150 | 180 |
| 11 | Grilamid ELY 60 | 160 | — | 10 | 90 | 0 | 150 | 170 | 150 | 150 | 178 |
| 12 | Grilamid ELY 60 | 160 | — | 5 | 95 | 0 | 150 | 170 | 150 | 150 | 179 |
| 13 | Griltex 1 | 110 | 600 | 50 | 50 | 0 | 150 | 150 | 130 | 130 | 151 |
| 14 | Griltex 1 | 110 | 600 | 40 | 60 | 0 | 150 | 150 | 130 | 130 | 145 |
| 15 | Griltex 1 | 110 | 600 | 30 | 70 | 0 | 150 | 150 | 130 | 130 | 147 |
| 16 | Griltex 1 | 110 | 600 | 20 | 80 | 0 | 150 | 150 | 130 | 130 | 149 |
| 17 | Griltex 1 | 110 | 600 | 50 | 50 | 0 | 150 | 150 | 130 | 130 | 147 |
| 28 | Griltex 1 | 110 | 600 | 10 | 90 | 0 | 150 | 150 | 130 | 130 | 153 |
| 19 | Griltex 1 | 110 | 600 | 5 | 95 | 0 | 150 | 150 | 130 | 130 | 153 |
| 20 | Griltex 2 | 125 | 400 | 50 | 50 | 0 | 150 | 150 | 130 | 130 | 150 |
| 21 | Griltex 2 | 125 | 400 | 20 | 80 | 0 | 150 | 150 | 130 | 130 | 153 |
| 22 | Griltex 3 | 110 | 500 | 50 | 50 | 0 | 150 | 150 | 130 | 130 | 143 |
| 23 | Griltex 4 | 110 | 100 | 50 | 50 | 0 | 150 | 150 | 130 | 130 | 143 |
| 24 | Griltex 5 | 80 | 150 | 50 | 50 | 0 | 120 | 100 | 105 | 100 | 125 |
| 25 | Griltex 5 | 80 | 150 | 80 | 20 | 0 | 100 | 100 | 110 | 120 | 126 |
| 26 | Griltex 5 | 80 | 150 | 60 | 40 | 0 | 100 | 100 | 110 | 120 | 130 |
| 31 | Griltex 5 | 80 | 150 | 40 | 60 | 0 | 100 | 100 | 110 | 120 | 128 |
| 32 | Griltex 5 | 80 | 150 | 30 | 70 | 0 | 100 | 100 | 110 | 120 | 131 |
| 27 | Capa 650 | 60 | 450 | 50 | 50 | 0 | 100 | 130 | 100 | 100 | 123 |
| 28 | Capa 650 | 60 | 450 | 30 | 70 | 0 | 150 | 170 | 150 | 150 | 164 |
| 29 | Capa 650 | 60 | 450 | 10 | 90 | 0 | 150 | 170 | 150 | 150 | 165 |
| 30 | Capa 650 | 60 | 450 | 5 | 95 | 0 | 150 | 170 | 150 | 150 | 165 |

[1]Melting point per DSC
[2]Melt vicority at 160° C. and 21.1 N according DIN 53 735
[3]Tsch = Temperature of the melt

TABLE 2

| | Material Properties of the starch mixture | | | | | | | | | |
|---|---|---|---|---|---|---|---|---|---|---|
| Example | Water[1] (wt. %) | Melting Point[2] (°C.) | Melt viscosity[3] (Pa s) | Modulus of Elasticity[4] (N/mm²) | Tenacity[5] (N/mm²) | Elongation[6] (%) | Cold Water Swelling (%) | Hot Water Dissolution | Transparency | Color |
| 2a | 11,60 | — | 259 | 78 | 10,5 | 434 | max. 10 | ja | nein | + |
| 2b | 4,40 | 107 | 1867 | 254 | 21,1 | 404 | max. 10 | ja | nein | + |
| 3 | 2,20 | 111 | 4508 | 499 | 17,5 | 221 | max. 10 | ja | nein | + |
| 4 | 1,80 | 115 | 6500 | 1038 | 26,6 | 4 | max. 10 | ja | nein | + |
| 5 | 1,60 | 113 | 8000 | 1393 | 30,4 | 3 | Auflosung | ja | nein | O |
| 6 | — | — | — | — | — | — | Auflosung | ja | nein | O |
| 13 | 5,5 | 143 | 215 | 117 | 14,6 | 434 | max. 10 | ja | gut | + |
| 14 | 7,65 | 145 | 255 | 71 | 13,0 | 520 | max. 10 | ja | gut | ++ |
| 15 | 7,57 | 147 | 275 | 110 | 9,6 | 355 | max. 10 | ja | sehr gut | ++ |
| 16 | 8,11 | 149 | 271 | 89 | 6,4 | 220 | Auflosung | ja | sehr gut | ++ |
| 17 | 5,59 | 147 | 263 | | | | max. 10 | ja | gut | ++ |
| 18 | 4,60 | 165 | 2840 | 190 | 9,3 | 64 | Auflosung | ja | sehr gut | ++ |
| 19 | 4,43 | 163 | 3575 | 160 | 8,2 | 66 | Auflosung | ja | gut | O |
| 20 | 7,60 | 146 | 265 | 75 | 14,0 | 510 | max. 10 | ja | sehr gut | ++ |
| 21 | 8,05 | 148 | 283 | 92 | 7,5 | 210 | Auflosung | ja | gut | ++ |
| 22 | | | | | | | max. 10 | ja | gut | ++ |
| 23 | | | | | | | max. 10 | ja | nein | ++ |
| 24 | | | | | | | max. 10 | ja | nein | ++ |
| 25 | 3,10 | | | | | | max. 10 | nein | nein | ++ |
| 26 | 3,30 | | | | | | max. 10 | nein | nein | ++ |
| 27 | 5,10 | 57 | 303 | 222 | 3,4 | 400 | max. 10 | ja | nein | ++ |
| 28 | 8,10 | 58 | 152 | 142 | 6,1 | 77 | Auflosung | ja | nein | ++ |
| 29 | 3,50 | 163 | 5299 | 330 | 10,3 | 18 | Auflosung | ja | nein | ++ |
| 30 | 3,100 | 161 | 5772 | 270 | n.g. | n.g. | Auflosung | ja | nein | ++ |

[1]Final water content according to DIN 53 714
[2]Melting point according to DSC
[3]Melt viscosity according to EMS, at 160° C. and 236.4 N
[4]Tensile modulus of elasticity according to DIN 53 457
[5,6]according to DIN 53 455

13
Production of the fibers according to the invention

EXAMPLES 33 to 43

Selected melt-spinnable compositions from Examples 1 to 32 are adjusted to different water contents and processed into filaments on a compact melt spinning-drawing unit. The unit includes a BARMAG extruder ZE4 (screw size D25/24D), a gear pump, and an electrically heated spinning block. For spinning, a die packet is used which is designed for highly viscous melt compositions and includes a special pressure plate and distributor plate, as well as a 68-hole die plate of nozzle diameter 0.35 mm. The filaments issuing from the die plate are cooled into a waterbath at 20°–23° C., drawn off over three heated twin rollers and drawn, and then conducted over an unheated fourth twin rollers to a winder.

In Example 43, a fatty acid ester (Mold-Wiz) is used instead of water for cooling the filaments.

In Example 44, monofilaments from the starch mixture of Example 26 are produced. For this, the throughput is increased, a 6-hole spinnerette plate (nozzle diameter 0.80 mm) is used, the threads are conducted separately over the drawing units, and wound individually onto spools. The resulting monofilaments have a diameter of 0.27 to 0.28 mm, a tenacity of 1.2 cN/dtex, and an elongation of 37%. The various water contents and test results are set forth in Table 3.

14
accordance with Example 45. The filaments are then guided over 5 rollers with idler rollers running at the following speeds and temperatures: 1625 m/min/unheated; 1650 m/min/55° C.; 2600 m/min/60° C.; 2750 m/min/65° C., and 2700 m/min/27° C. The spin-drawn thread is wound at 2600 m/min. It shows a count of dtex 170f34, a tenacity of 1.6 cN/dtex, and an elongation of 25.5%.

EXAMPLE NO. 47

The multifilaments of Example 40 are bundled at a speed of 120 m/min to a total titer of 2000 tex, conducted through a stuffer box for crimping, dried continuously at 70° C. in an apron conveyor drier, and cut in a FLEISSNER cutting machine to a length of 80 mm. These staple fibers of a titer of 30 dtex exhibit a tenacity of 1.4 cN/dtex and an elongation at rupture of 27%. This example shows that such starch mixtures can be processed in a single-stage using a compact spin-drawing unit to form staple fibers.

EXAMPLE 48

The starch mixture of Example 24 is processed to form staple fibers according to the two-stage spin and drawing method. The granulate of Example 24 is melted in a BARMAG 6E4 extruder and forced at a rate of 877 g/minute through a spinerette packet with a 210 mm diameter spiner-

TABLE 3

Manufacturing parameters and test data of the fibers according to the invention

| Filament Example No. | Molding composition Example No. | Water content % | Spinning Temperature °C. | Roller Temperature °C. | Total Drawing Ratio 1: | Winding Speed m/min. | Filament Data | | |
|---|---|---|---|---|---|---|---|---|---|
| | | | | | | | Count dtex | Tenacity cN/dtex | Elongation % |
| 33 | 3 | 2.3 | 140 | 62/63/64/24 | 3.22 | 116 | 3710 | 0.6 | 32.5 |
| 34 | 8 | 1.8 | 158 | 74/75/105/25 | 3.55 | 160 | 2700 | 1.0 | 29.4 |
| 35 | 15 | 2.2 | 152 | 68/68/90/24 | 3.25 | 240 | 1790 | 0.8 | 24.2 |
| 36 | 20 | 2.5 | 148 | 60/62/70/22 | 4.50 | 200 | 2150 | 1.3 | 31.5 |
| 37 | 25 | 2.1 | 143 | 60/62/65/23 | 5.50 | 215 | 2000 | 2.2 | 57.2 |
| 38 | 26 | 1.4 | 137 | 59/62/64/23 | 5.30 | 215 | 2000 | 1.5 | 40.1 |
| 39 | 24 | 1.4 | 137 | 61/60/65/23 | 5.10 | 215 | 2000 | 1.4 | 29.8 |
| 40 | 31 | 2.3 | 136 | 60/60/65/22 | 4.88 | 215 | 2000 | 1.2 | 24.5 |
| 41 | 32 | 2.2 | 138 | 60/61/65/22 | 3.50 | 160 | 2680 | 0.7 | 26.1 |
| 42 | 28 | 1.4 | 116 | 22/23/24/22 | 4.25 | 180 | 2430 | 0.9 | 22.0 |
| 43 | 1 | 6.0 | 136 | 50/54/55/23 | 2.40 | 120 | 3800 | 0.5 | 16.0 |
| 44 | 26 | 1.4 | 136 | 60/63/63/23 | 5.50 | 116 | 883 | 1.3 | 33.5 |

EXAMPLE NO. 45

The starch mixture of Example 24 is used for rapid spinning. The granulate with a water content of 1.4% is melted in a BARMAG 3E8 extruder (screw size D30/30D), forced, at a spinning temperature of 146° C., through a die packet with a 34-hole spinnerette plate of nozzle diameter 0.35 mm, and the resulting threads are cooled by a cross current of the air. The threads are then oiled with spin finish, drawn off over a roller with idler roller at 2520 m/min, interlaced, and wound onto a spool at 2500 m/min. The resulting multifilament of titer dtex 190/34 shows a tenacity of 1.4 cN/dtex at an elongation of 46%. This multifilament is suitable for draw texturing to form textured yarn.

EXAMPLE 46

The starch mixture of Example 24 is used for spin-stretching. Spinning, cooling, and oiling are carried out in ette plate having 645 holes, each with a nozzle diameter of 0.40 mm. The spun threads are cooled by a transverse current of air and a spin finish is applied thereto. The threads are guided over 4 rollers in an open loop to the can where they are deposited at a rate of 680 m/minute. The count of the spun cable is tex 1290f645.

The spun fibers are drawn simultaneously from 3 of these cans and guided together through a 0.5% solution of finisher in water. They are then guided over 3 drawing units having 2 rollers each, at rates and temperatures of 56.0 m/minute/58° C., 103 m/min/60° C., and 100.5 m/minute/unheated.

Subsequently, they are wetted in a brightening device containing a 3% finish solution, crimped in a crimping chamber, dried at 70° C. in an apron conveyor drier, and cut in a fiber cutter to a fiber length of 80 mm. The resulting crimped staple fiber has a single titer of 11.0 dtex, a tensile strength of 1.5 cN/dtex, and an elongation at rupture of 31.5%.

EXAMPLE 49

Fibers of component (A) without component (B):

Using the process described in Example 1, a starch molding composition which was subsequently granulated, was produced from 70 parts by weight hydroxypropyl corn starch having a degree of substitution of 0.06 and an amylose content of 85% by weight as well as 15 parts by weight of glycerol, 13 parts by weight of sorbitol, 2 parts by weight of urea, and 5 parts by weight of the processing aid "Paraloid K125/175" 3:2. This starch molding composition with a water content of 7.7% by weight was melt-spun according to Example 44 at a spinning temperature of 136° C. on a spinning installation as described in Examples 33 to 43, but having now according to Example 44 a spin pack with 6 hole and nozzle diameters of 0.8 min. The resulting elementary threads were cooled with air, conducted separately over the stretching groups and spooled singly.

Using godet temperatures of 50/55/55/25° C., a drawing ratio of 1:1.79 and a rate of 15.3 m/min, the resulting monofiles or threads had a diameter of 0.40 mm, a tensile strength of 0.24 cN/dtex and an elongation at break of 85%.

While only a limited number of specific embodiments of the present invention have been expressly disclosed, it is, nonetheless, to be broadly construed and not to be limited except by the character of the claims appended hereto.

What we claim is:

1. Rapidly biodegradable fibers produced by a melt-spinning process and comprising
   A. 20 to 95 parts of a melt-spinnable composition comprising
      1. 56 to 96 parts of at least one modified starch,
      2. 4 to 40 parts of a destructuring agent, and
      3. 0 to 4 parts of at least one additive selected from the group consisting of urea, emulsifiers, lubricants, proteins, and alkali salts of proteins, components 1, 2, and 3 totaling 100 parts; and
   B. 80 to 5 parts of at least one melt spinnable polymer having a melting or softening point of 50° to 220° C. selected from the group consisting of aliphatic polyamides, aliphatic polyesters and homo- and copolyamides of omega amino carboxylic acids and lactams.

2. The fibers of claim 1 wherein said component 1 is 10 to 100 parts, component 2 is 90 to 66 parts, component 3 is 10 to 30 parts, and component B is 80 to 5 parts, said at least one additive being selected from the group consisting of urea, emulsifiers, and lubricants.

3. The fibers of claim 1 wherein said destructurizing agent comprises a plasticizer.

4. The fiber of claim 1 wherein said additive is 0.1 to 2.0 parts of urea and 0.1 to 2.0 parts of at least one emulsifier.

5. The fibers of claim 1 wherein said starch has a natural water content of 5% to 16%.

6. The fibers of claim 1 wherein said starch has an amylose content of 20% to 100%.

7. The fibers of claim 1 wherein said starch has been modified by reaction of its OH groups with at least one substance selected from the group consisting of ether-, ester-, urethane-, carbamate-, and isocyanate-forming substances.

8. The fibers of claim 7 wherein said starch is a hydroxyalkyl, acetyl, carbamate starch or a mixture thereof, said alkyl having 2 to 6 carbon atoms.

9. The fibers of claim 7 wherein said starch has a substitution degree of 0.01 to 3.0.

10. The fibers of claim 7 wherein said starch is starch acetate and said substitution degree is 2.0 to 3.0.

11. The fibers of claim 1 wherein said destructuring agent comprises a plasticizer which is at least one organic compound having at least one hydroxyl group.

12. The fibers of claim 1 wherein said at least one additive comprises 0.1 to 1 part of an emulsifier.

13. The fibers of claim 1 wherein said emulsifier has an HLB value of 0 to 20.0.

14. The fibers of claim 1 wherein said at least one additive comprises 0.1 to 2 parts of urea.

15. The fibers of claim 1 wherein said melt-spinnable polymer has a melt flow index (MFI) of 10 to 10,000 Pa.s at 21.2N and a temperature of 30° C. above said melting or softening point.

16. The fibers of claim 1 wherein said melt-spinnable polymer is at least partially biodegradable, itself or in homogeneous mixtures with starch.

17. The fibers of claim 1 wherein said melt-spinnable polymer is at least one polyamide.

18. The fibers of claim 1 wherein said melt-spinnable polymer is selected from the group consisting of polyhydroxybutyrates, polyhydroxyvalerates, polycaprolactone, polyesters, and mixtures thereof.

19. The fibers of claim 17 wherein said polyamide is a homo- and/or copolyamide derived from omega-amino carboxylic acids having 2 to 12 carbon atoms, lactams having 4 to 12 carbon atoms, and/or from the reaction of diamines having 2 to 12 carbon atoms with dicarboxylic acids having 2 to 12 carbon atoms.

20. The fibers of claim 1 further comprising a branching or cross-linking agent.

21. The fibers of claim 20 wherein said branching or cross linking agent is selected from the group consisting of isocyanate-, formaldehyde-, epoxy-, anyhydride-, ether-, ester-, amide-forming groups, and mixtures thereof.

* * * * *